(12) United States Patent
Herdman et al.

(10) Patent No.: US 7,309,411 B2
(45) Date of Patent: Dec. 18, 2007

(54) ELECTROLYTE MEDIA FOR THE DEPOSITION OF TIN ALLOYS AND METHODS FOR DEPOSITING TIN ALLOYS

(76) Inventors: Roderick D. Herdman, 3 Cedar Crescent, Kingsbury, Tamworth, Staffordshire (GB) B78 2JQ; Trevor Pearson, 8 Cricketers Meadow, Cradeley Heath (GB) B647HR ( * ) Notice: Subject to any disclaimer, the term of this patent is extended or adjusted under 35 U.S.C. 154(b) by 375 days.

(21) Appl. No.: 10/470,792

(22) PCT Filed: Mar. 13, 2002

(86) PCT No.: PCT/GB02/01044

§ 371 (c)(1),
(2), (4) Date: Jul. 30, 2003

(87) PCT Pub. No.: WO02/072923

PCT Pub. Date: Sep. 19, 2002

(65) Prior Publication Data

US 2004/0065558 A1   Apr. 8, 2004

(30) Foreign Application Priority Data

Mar. 13, 2001   (GB) .................. 0106131.6

(51) Int. Cl.
*C25D 5/18* (2006.01)
*C25D 3/60* (2006.01)
(52) U.S. Cl. ............... 205/104; 205/252; 205/253; 205/254
(58) Field of Classification Search ........ 205/104, 205/252

See application file for complete search history.

(56) References Cited

U.S. PATENT DOCUMENTS

| | | | |
|---|---|---|---|
| 3,865,699 A * | 2/1975 | Luch | 205/158 |
| 3,951,760 A | 4/1976 | Fueki et al. | |
| 3,966,564 A | 6/1976 | Hyner et al. | |
| 4,021,316 A | 5/1977 | Fueki et al. | |
| 4,029,556 A | 6/1977 | Monaco et al. | |
| 4,168,223 A | 9/1979 | Igarashi et al. | |
| 4,662,999 A * | 5/1987 | Opaskar et al. | 205/254 |
| 4,795,682 A | 1/1989 | Turner et al. | |
| 4,828,657 A | 5/1989 | Fukuoka et al. | |
| 5,156,729 A * | 10/1992 | Mahrus et al. | 205/104 |
| 5,173,109 A * | 12/1992 | Iantosca | 106/1.22 |
| 5,750,017 A * | 5/1998 | Zhang | 205/102 |
| 5,827,413 A * | 10/1998 | Yamaguchi et al. | 204/293 |
| 6,129,995 A * | 10/2000 | Hashimoto et al. | 428/629 |
| 6,312,579 B1 * | 11/2001 | Bank et al. | 205/95 |
| 6,547,944 B2 * | 4/2003 | Schreiber et al. | 205/96 |

OTHER PUBLICATIONS

F. A. Lowenheim, Electroplating, McGraw-Hill Book Co., New York, 1978, p. 19.*
Electrodeposition of Sn-Co Alloys from Gluconate Baths; Journal of Applied Electrochemistry, S.S. Abd El Rehim et al, 26 (1996) 413-418.
Derwent Publications Ltd., XP-002269507, Shinko Kinzoku KK, JP 55068289, May 24, 1980.

* cited by examiner

*Primary Examiner*—Roy King
*Assistant Examiner*—William T. Leader
(74) *Attorney, Agent, or Firm*—Carmody & Torrance LLP

(57) ABSTRACT

An electroplating bath medium for electroplating articles with a tin-cobalt, tin-nickel, or tin-cobalt-nickel alloy comprises: at least one tin salt; an alloying metal salt comprising a cobalt salt and/or a nickel salt; a complexant comprising a hydroxycarboxylic acid or alkali metal salt thereof such as a sodium or potassium gluconate or heptonate complexant; boric acid; and a bath soluble substituted phenolic compound. The current regime applied to the plating bath can include time intervals of direct current and of pulsed current in order to selectively control the deposition of tin by activation or diffusion control.

14 Claims, 1 Drawing Sheet

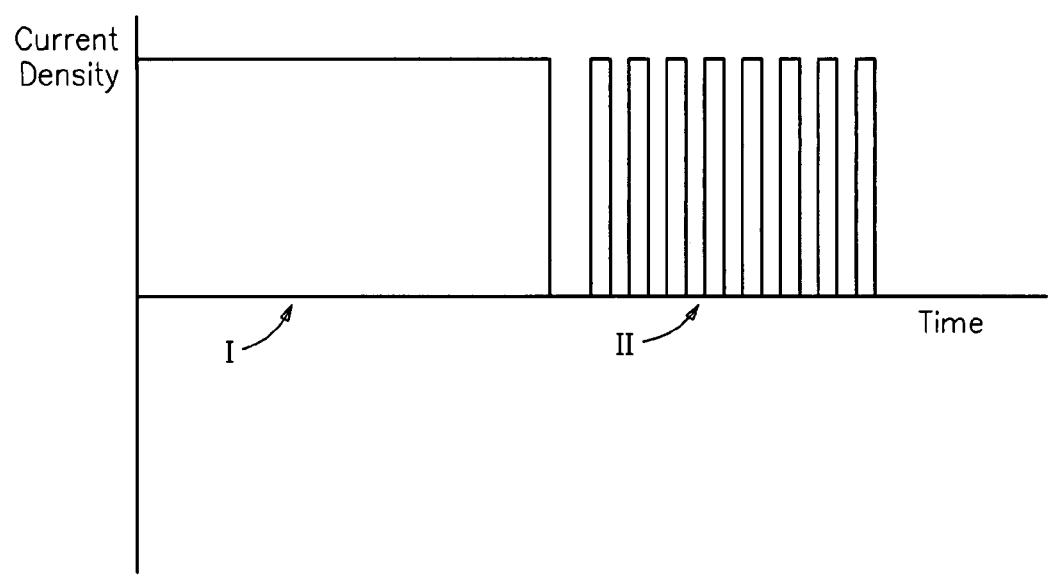

ELECTROLYTE MEDIA FOR THE DEPOSITION OF TIN ALLOYS AND METHODS FOR DEPOSITING TIN ALLOYS

CROSS REFERENCE TO RELATED APPLICATIONS

This application is the National Stage of International Application No. PCT/GB02/01044, filed Mar. 13, 2002.

BACKGROUND OF THE INVENTION

The present invention relates to the deposition of tin alloys, especially tin-cobalt alloys, tin-nickel alloys and tin-nickel-cobalt alloys and to electrolyte media for use in the deposition of such alloys. The invention relates especially to the use of such alloys as bearing overlays.

The "End of Life" vehicle regulations in Europe for 2003 aim to increase the "recyclability" of vehicles by removing toxic materials such as hexavalent chromium and lead. One common use of lead in automotive applications is the use of lead alloys in bearing overlays. Overlays are generally soft alloys deposited onto harder bearing alloys to produce a surface having compatibility and conformability with a co-operating shaft and also to provide a means of embedding debris particles to prevent damage to the shaft. More than 300,000,000 bearing shells are currently plated every year. The most commonly applied bearing overlay material is a lead-tin-copper alloy containing at least 90% lead. In higher performance engines, lead-indium (where the indium is plated on top of the bearing and diffused into the underlying lead) is commonly applied. Clearly, in order to comply with the 2003 regulations, a replacement for lead must be found.

A suitable replacement alloy must be soft enough to allow the bearing to "bed in" correctly and the melting point of the alloy must be higher than 250° C. because engine operating temperatures can approach this level. Tin-based alloys are an obvious choice as they have good lubrication properties and are soft enough. The low toxicity of tin is also an advantage. Tin cannot be used alone because the melting point of tin is too low. The easiest alloy of tin to produce would be a tin-copper alloy. A tin-copper alloy containing approximately 5% copper would have the required melting point. However, tests have shown that tin-copper alloys do not have the necessary fatigue strength. Tin zinc alloys can readily be produced but these alloys fail corrosion testing due to the appearance of white corrosion products from the sacrificial corrosion of the zinc in the alloy.

Other tin based alloys include tin-nickel, tin-cobalt or ternary alloys comprising all three of these metals. The use of these alloys for bearing overlays has already been suggested. In particular, tin cobalt has been found to be advantageous. U.S. Pat. No. 4,795,682 discloses the use of tin cobalt alloys containing preferably between 2-8% cobalt. These alloys are claimed to have superior fatigue resistance as compared to standard lead-tin-copper bearing overlays (90-100 Mpa as compared to 60-70 Mpa when tested on a "Sapphire" testing machine). However, as far as the applicant is aware, these alloys have not been exploited commercially due to the difficulty of producing a tin cobalt alloy of the required composition and thickness. According to U.S. Pat. No. 4,795,682, the tin cobalt alloy overlays were produced by the technique known as "Brush Plating" where the coating is applied manually by brushing the bearing with an anode coated with an absorbent material soaked in an electrolyte containing tin and cobalt salts and a gluconate complexant. This technique is not easily applicable to mass production techniques and so the use of tin-cobalt alloy for bearing overlays has not been possible in commercial practice in spite of its performance advantages.

The production of tin-cobalt alloys is also described in other prior art documents. One commercial use of tin-cobalt alloys is in the production of thin overlays for nickel plated components as a replacement for chromium. However, it is not possible to produce thick coatings from these electrolytes as the content of tin is only 2-4 g/l. These electrolytes also produce coatings of a composition approximating to the intermetallic alloy composition (20-25% cobalt), whereas the optimum desired composition is about 2-8% cobalt for bearing alloys since the intermetallic composition is too hard.

Several compositions have been proposed in the patent literature which claim to be suitable for producing thicker deposits of tin-cobalt alloys.

U.S. Pat. Nos. 3,951,760 and 4,021,316 suggest an alkaline bath based on pyrophosphate and utilising an organo sulphur compound as a brightening agent and peptones as grain refining agents. Baths based on pyrophosphate have the disadvantage that the stannous tin ions are not stable in alkaline media and quickly oxidise to stannic tin rendering the bath useless. Also, insoluble anodes have to be used in these baths as tin does not dissolve effectively in these pyrophosphate baths. These baths would therefore be unsuitable for the high volume production of plated bearings.

Several patents have been granted for baths based on stannous chloride and cobalt chloride also containing fluoride in order to complex the tin ions and facilitate co-deposition of cobalt (U.S. Pat. Nos. 3,966,564 and 4,029,556). These electrolytes are very corrosive and toxic and because they contain large amounts of ammonium ions, they are difficult to effluent treat. Additionally, these electrolytes produce an intermetallic alloy over a wide range of current densities and so are unsuitable for producing alloys of the required composition.

U.S. Pat. No. 4,168,223 describes a citrate-based bath from which it is claimed tin-cobalt alloys could be deposited However, attempts by the present applicant to reproduce the examples cited in U.S. Pat. No. 4,168,223 resulted in only deposits of pure tin with no co-deposition of cobalt (when examined by Energy Dispersive X-ray Analysis).

A more recent patent (U.S. Pat. No. 4,828,657) discloses baths based on stannic tin in either alkaline or acidic media. Maintenance of tin concentration in these baths is very difficult as it is not possible to directly dissolve tin anodes in stannic baths because build-up of stannite ions in the bath leads to spongy deposition. Also, if acid baths are formulated based on stannic tin, the tin tends to eventually precipitate as alpha or metastannic acid.

SUMMARY OF THE INVENTION

The present invention seeks to provide a method of depositing smooth, functional alloy coatings of tin and an alloying metal comprising nickel and/or cobalt, the coating having a thickness of up to and in excess of about 50 microns and a composition of about 1-25% (preferably about 2 to 15% and especially about 2 to 8%) of the alloying metal and to provide electrolyte media and electroplating baths and bath media suitable for use in the method. The invention also relates to tin alloys and bearing overlays produced by the method.

BRIEF DESCRIPTION OF THE DRAWING

FIG. 1 depicts a schematic representation of a portion of a direct current and pulsed current cycle in accordance with the present invention.

DETAILED DESCRIPTION OF THE INVENTION

According to a first aspect of the invention, there is provided a process for electroplating a substrate with a tin alloy, which alloy comprises from about 2% by weight to about 15% by weight of alloying metal, said process comprising:
- a) contacting the substrate with an electroplating bath medium comprising:
  1. a soluble stannous tin salt;
  2. a soluble salt of the alloying metal; and
  3. a complexing agent;
- b) applying a current regime which includes a first condition in which the average current density is such that the alloying metal is deposited and a second condition in which the average current density is lower than in the first condition such that substantially only tin is deposited.

It is particularly preferred that the current regime comprises applying a pulsed current, and especially that the current regime comprises applying a direct current for at least one first time interval and applying a pulsed current for at least one second time interval.

Preferably the tin salt, the alloying metal salt and the complexing agent respectively are selected from those set out in accordance with the second aspect of the invention below.

According to a second aspect of the present invention, a composition for the preparation of an electroplating bath medium for electroplating of tin and an alloying metal comprising cobalt and/or nickel alloys comprises:
- (a) at least one tin salt selected from the group comprising stannous sulphate, stannous chloride, stannous methanesulphonate, stannous fluoborate, stannous phenolsulphonate and stannous toluenesulphonate;
- (b) at least one alloying metal salt selected from the group comprising cobalt sulphate, nickel sulphate, cobalt chloride, nickel chloride, cobalt methanesulphonate, nickel methanesulphonate, cobalt fluoborate, nickel fluoborate, cobalt phenolsulphonate, nickel phenolsulphonate, cobalt toluenesulphonate and nickel toluenesulphonate;
- (c) one or more bath complexants selected from the group comprising mono-, di- or poly-hydroxy carboxylic acids or alkali metal salts thereof; and
- (d) boric acid.

The tin salt is preferably present in a concentration range of about 2 to about 80 g/l. Either the cobalt salt or the nickel salt or a combination of both may be used. A concentration range of about 10 to about 250 g/l in total of the salt(s) of group (b) will preferably be present in the plating bath. The bath complexing agent (complexant) will preferably be present in the bath in a concentration of about 20 to about 200 g/l. Although polycarboxylic acid are presently preferred as the bath complexant, mono- and di-carboxylic acids respectively provide good results and are also favored in the present invention. Preferred examples of suitable bath complexants include lactic acid, malic acid, tartaric acid, gluconic acid, glucoheptonic acid, ascorbic acid, glycolic acid, and citric acid or alkali metal salts thereof. The boric acid is preferably present in the bath in a concentration range of about 10 to about 150 g/l.

According to a third aspect of the invention there is provided an electroplating bath medium for electroplating tin-cobalt or tin-nickel alloys comprising the composition of the second aspect of the invention, and
- e) a grain refining agent comprising a bath soluble substituted phenolic compound of the formula:

where n is an integer from 1 to 100, m is 2 or 3 and R1 is either a phenolic group of the formula:

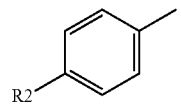

where R2 is a (C1 to C14) alkyl group or, an alpha or beta naphthalene group of the formula:

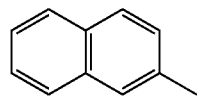

and, R3 is selected from the group comprising H, $CH_2CH_2OH$, $CH_2CH_2CH_2OH$, $CH_2CH(OH)CH_2SO_3H$ and $CH_2CH_2CH_2SO_3H$.

These compounds are preferably present in the bath in concentrations of between about 10 ppm and about 10 g/l.

In addition to these essential ingredients, the bath medium may optionally contain anionic wetting agents to reduce surface tension and aid the dissolution of the grain refining phenolic compounds (e) in the bath medium. Salts such as sodium sulphate and/or ammonium chloride may be added to increase the conductivity of the bath medium.

A fourth aspect of the invention provides an electroplating bath comprising an electroplating bath medium according to the second aspect of the invention and a vessel for containing the medium. Preferably, the electroplating bath comprises at least one tin anode.

A fifth aspect of the present invention provides a process for electroplating an article with a tin-alloy coating, which process includes the step of immersing the article in an electroplating bath according to the third fourth of the invention.

In preferred embodiments of the fifth aspect of the invention, the process includes the step of utilising a current regime which includes a first condition in which the average current density is such that the at least one alloying metal is deposited and a second condition in which the average current density is lower than in the first condition such that substantially only tin is deposited. In the first condition, tin may also be deposited with at least one alloying metal.

The invention also relates to electroplated articles produced by the processes of the invention and especially to electroplated bearings wherein the electroplated coating constitutes a bearing overlay.

Bath media formulated according to the invention are stable in operation, contain no highly toxic or corrosive components and can be readily effluent treated. The operating pH of the medium bath in an electroplating bath is preferably between 2 and 3 (although the bath may be operated between pH 1.5 to 6). At this pH, tin anodes may be utilised so the electroplating process may be operated on a continuous basis. Without wishing to be bound by theory, the applicants believe that the boric acid reacts with the hydroxyl groups on the complexant species to form borohydroxycarboxylate complexes. Typically, the baths are operated at temperatures from about 20 to 70° C. and at current densities (subject to the pulsed current techniques discussed below) between about 2 and about 5 A/dm$^2$.

Deposits produced from the baths of the present invention are smooth and fine-grained. By using direct current with the electrolyte medium of the invention to plate Hull cell panels, and analysing the deposit composition at various positions along the panel, the present inventors have been able to determine a relationship between current density and alloy composition. The inventors have found that below a certain threshold current density (typically between 2 and 3 A/dm$^2$), a deposit consisting essentially of 100% tin (analysed by energy dispersive X-ray analysis) is typically deposited. Above this current density, an alloy is deposited of composition dependent on the bath formulation, temperature and pH.

Thus, the inventors have appreciated that alloy coatings produced from the electrolyte medium of the invention show a particular compositional dependence on the applied current density. Without wishing to be bound by theory, the inventors postulate that at low current densities the deposition process is under activation control and a deposit consisting essentially of pure tin results. At higher current densities, the deposition of tin is under diffusion control and this mass-transport limitation of tin deposition allows co-deposition of cobalt or nickel. A very large difference in the composition of the obtained alloy coating results as the electroplating moves (with increasing current density) from activation control to diffusion control. This relatively sudden change conventionally makes fine control of the composition of the deposited alloy difficult to achieve.

However, the inventors have appreciated that this difficulty can be turned to significant advantage. In accordance with the present invention, the current density during plating can be varied, or pulsed current can be used, in order to control, in any given time period, whether the plating system is acting under diffusion control or activation control of tin deposition. In this way, fine control of the deposited alloy composition is achievable, or compositionally modulated alloy layers can be deposited. Pulsed current techniques per se are known in the art.

For example, a compositionally modulated alloy of the correct desired average composition may be achieved by utilising a current which "surges", i.e. alternates, between high and low current density.

Alternatively, the composition of the deposited alloy can be controlled by using a pulsed current. Preferably, a current regime is employed including time intervals of direct current and of pulsed current. In the direct current time interval, deposition proceeds under diffusion control. By switching between direct current and pulsed current, activation control of tin depositon is re-established in the pulsed current cycle because the "off" time between current pulses allows time for tin to diffuse to the cathode surface. Adjustment to the relative lengths of the direct current and pulsed current time intervals and adjusting also (or alternatively) the duty cycle (as defined below) of the pulsed current can be used to compensate for compositional variation, temperature variation or hydrodynamic variation in a plating bath, thereby ensuring consistent plating results. A schematic representation of a portion of a direct current and pulsed current cycle is shown in FIG. 1.

Thus in FIG. 1, time interval I represents a period of direct current and time interval II represents a period of pulsed current. In each time interval I, the current density is such that the diffusion control of tin deposition is achieved. In the time interval II as illustrated, the pulsed current changes between an "on" pulse period at which the current density is the same as that in time interval I, and an "off" pulse period at which the current density is substantially zero. In variations of the invention, in time interval II the current density in the "on" pulse period need not be the same as the current density in time interval I, provided only that the currently density is sufficient to enable diffusion control of tin deposition to be established. Also, in the "off" pulse period of time interval II, the current density need not be zero, provided that it is low enough to allow activation control of tin deposition, allowing time for tin ions to diffuse to the cathode surface. The duty cycle, mentioned above, is defined as the percentage of the pulsed current time period (time interval II) when the current is in an "on" pulse period.

The invention will now be described with reference to working examples:

EXAMPLE 1

A bath medium was made to the following formulation:

| | |
|---|---|
| Sodium Gluconate | 150 g/l |
| Boric Acid | 100 g/l |
| Stannous Sulphate Anhydrous | 30 g/l |
| Cobalt Sulphate Hexahydrate | 100 g/l |
| Lugalvan BNO 24* | 1 g/l |
| Empicol ESB3 Anionic Surfactant** | 1 g/l |

*Lugalvan BNO 24 is an ethoxylated beta-napthol in accordance with a compound of class e). It is manufactured by BASF.
**Empicol ESB3 is an anionic surfactant manufactured by Albright & Wilson PLC.

The bath was heated to 50° C. and a Hull cell test was performed at 1 amp for 10 minutes using agitation by mechanical stirrer. The resultant deposit was smooth and even. At a position on the panel corresponding to a primary current density of 4 A/dm$^2$, a tin cobalt alloy was obtained having a composition of approximately 16% cobalt with the balance being tin. This example illustrates that a significant decrease in the amount of cobalt (as compared to the intermetallic composition) is achieved using the electrolyte medium of the invention. A still further reduction in the amount of cobalt is, however, desirable.

EXAMPLE 2

A bath medium was made to the following formulation:

| | |
|---|---|
| Sodium Gluconate | 150 g/l |
| Boric Acid | 100 g/l |
| Stannous Sulphate Anhydrous | 30 g/l |
| Nickel Sulphate Hexahydrate | 75 g/l |
| Cobalt Sulphate Hexahydrate | 7 g/l |
| Lugalvan BNO 24 | 1 g/l |
| Empicol ESB3 | 1 g/l |

A Hull cell test as in Example 1 was performed at a temperature of 20° C. The deposit obtained was smooth and even. At a position on the panel corresponding to a primary current density of 4A/dm², a tin nickel cobalt alloy was obtained having a composition of 8-10% nickel and 1-2% cobalt with the balance being tin. This example illustrates that a ternary tin-cobalt-nickel alloy can be produced using the electrolyte medium, resulting in an alloy having useful amounts of nickel and cobalt.

EXAMPLE 3

A Hull cell test was performed on a bath of composition as in Example 1, but substituting nickel sulphate hexahydrate for cobalt sulphate hexahydrate, and using the same conditions as in Example 1. A tin-nickel alloy was obtained having a composition of about 14% nickel, with the balance being tin.

EXAMPLE 4

A Hull cell test was performed on a bath of composition as in Example 1 at a temperature of 60° C. A tin cobalt alloy was obtained at 4 A/dm² having a composition of 21% cobalt with the remainder being tin.

EXAMPLE 5

A Hull cell test was performed on a bath of composition as Example 2 at a temperature of 60° C. A tin nickel cobalt alloy was obtained at 4 A/dm² having a composition of 15% nickel, 3% cobalt and the remainder being tin.

EXAMPLE 6

2 liters of the bath medium of Example 1 was placed in a plating cell equipped with mechanical agitation and a tin anode. A small test piece was plated at an average current density of 4 A/dm² at a bath temperature of 60° C. The resulting deposit was analysed and found to consist of 22% cobalt.

A test piece was then plated at 2 A/dm² in a similar manner. The resulting deposit had a composition of 100% tin.

A third sample was produced using pulsed current A programmable pulse-plating unit (JCT Controls Ltd) was used with the following parameters:

| Channel 1 | Direct Current 20 seconds |
| Channel 2 | Pulsed current 100 Hz, 30% duty cycle 60 seconds |

The plating voltage was adjusted so that during the DC cycle (Channel 1), the current density on the test piece was 4 A/dm². The sample was plated for 15 minutes (the average current density was observed to fall approximately 1.3 A/dm² during pulsed current cycle). The resulting deposit was analysed and found to be 5.5% cobalt with the remainder being tin. This is the ideal composition for bearing overlays.

EXAMPLE 7

A sample was plated using the same method as the pulsed current sample of Example 5 but using the following parameters:

| Channel 1 | Direct Current 30 seconds |
| Channel 2 | Pulsed Current 100 Hz 30% duty cycle 30 seconds |

The alloy composition of a test piece plated with these parameters was determined to be 10.2% cobalt. This example serves to illustrate the ease of control of the deposit composition by adjusting pulse parameters.

EXAMPLE 8

The bath medium of Example 1 was used in the plating cell of Example 5 to produce a test piece. A temperature of 60° C. was used. A test piece was plated using alternate current densities of 4 and 2 A/dm² (30 seconds each) to produce a layered coating. The deposit composition was analysed and found to be 10.5% cobalt. This example illustrates an alternative means of controlling the alloy composition.

EXAMPLE 9

A bath medium was made to the following formulation;

| | |
|---|---:|
| Stannous sulphate anhydrous | 30 g/l |
| Cobalt sulphate hexahydrate | 100 g/l |
| Boric acid | 100 g/l |
| Sodium potassium tartrate tetrahydrate | 150 g/l |
| Ralufon NAPE 14-90*** | 2 g/l |

***Ralufon NAPE 14-90 is a sulphopropylated 2-naphthol ethoxylate available from Raschig GmbH.

The bath was adjusted to pH 3.0 with sulphuric acid or sodium hydroxide solution as required, heated to 50° C. and a Hull cell test was performed under the following pulse plating regime:

| Channel 1 | Direct Current 20 seconds |
| Channel 2 | Pulsed current 100 Hz, 30% duty cycle, 60 seconds. |

The current used was 1 amp during the d.c. cycle, this fell to approx 0.3 amps (average) during the pulse cycle. The plating time was 20 minutes. The panel was analysed and found to contain 3.5% cobalt at a point corresponding to a current density of 4 A/dm² during the d.c. cycle.

This example illustrates the use of a di-hydroxy carboxylic acid.

EXAMPLE 10

A bath medium was made to the following formulation;

| | |
|---|---:|
| Stannous sulphate anhydrous | 30 g/l |
| Cobalt sulphate hexahydrate | 100 g/l |
| Boric acid | 100 g/l |
| Sodium potassium tartrate tetrahydrate | 50 g/l |
| Sodium gluconate | 100 g/l |
| Ralufon NAPE 14-90*** | 2 g/l |

The bath was adjusted to pH 3.0, heated to 50° C. and a Hull cell test was performed under the same conditions as Example 9.

The panel was analysed and found to contain 7.3% cobalt at a point corresponding to a current density of 4 A/dm² during the d.c. cycle, and 3.2% cobalt at a point corresponding to 3 A/dm².

EXAMPLE 11

A bath medium was made to the following formulation;

| | |
|---|---|
| Stannous sulphate anhydrous | 30 g/l |
| Cobalt sulphate hexahydrate | 100 g/l |
| Boric acid | 100 g/l |
| Sodium potassium tartrate tetrahydrate | 100 g/l |
| Sodium gluconate | 50 g/l |
| Lugalvan BNO24 | 1 g/l |
| Empicol ESB3 | 1 g/l |

The bath was adjusted to pH 3.8, heated to 50° C. and a Hull cell test was performed under the same conditions as Example 9.

The panel was analysed and found to contain 5.3% cobalt at a point corresponding to a current density of 3 A/dm² during the d.c. cycle.

EXAMPLE 12

A bath medium was made to the following formulation;

| | |
|---|---|
| Stannous sulphate anhydrous | 30 g/l |
| Cobalt sulphate hexahydrate | 100 g/l |
| Boric acid | 100 g/l |
| Malic acid | 100 g/l |
| Lugalvan BNO24 | 1 g/l |
| Empicol ESB3 | 1 g/l |

The bath was adjusted to pH 3.8, heated to 50° C. and a Hull cell test was performed under the same conditions as Example 9.

The panel was analysed and found to contain 3.4% cobalt at a point corresponding to a current density of 4 A/dm² during the d.c. cycle.

This example illustrates the use of a mono-hydroxy carboxylic acid.

The invention claimed is:

1. A process for electroplating a substrate with a tin alloy, which alloy comprises from about 2% by weight to about 15% by weight of alloying metal, said process comprising:
   a) contacting the substrate with an electroplating bath comprising:
      1. a soluble stannous tin salt;
      2. a soluble salt of the alloying metal; and
      3. a complexing agent;
   b) applying a current regime in which a direct current having a substantially constant current density is applied for a first time interval and a pulsed current is applied for a second time interval, wherein said first time interval and said second time interval are consecutive,
   wherein the pulsed current comprises a first pulse period at a first current density and a second pulse period in which the current density is substantially zero, wherein the first pulse period and the second pulse period are alternated, whereby a duty cycle of pulsed current is established; and
   wherein during the first time interval the alloying metal is deposited along with the tin and during the second time interval substantially only tin is deposited.

2. A process as claimed in claim 1 wherein the alloying metal is selected from the group consisting of cobalt, nickel and combinations of the foregoing.

3. A process according to claim 1 wherein the electroplating bath further comprises boric acid.

4. A process according to claim 1 wherein the tin salt is selected from the group consisting of stannous sulphate, stannous chloride, stannous methanesulphonate, stannous fluoborate, stannous phenolsulphonate and stannous toluenesulphonate.

5. A process according to claim 1 wherein the alloying metal salt is selected from the group consisting of cobalt sulphate, nickel sulphate, cobalt chloride, nickel chloride, cobalt methanesulphonate, nickel methanesulphonate, cobalt fluoborate, nickel fluoborate, cobalt phenolsulphonate, nickel phenolsulphonate, cobalt toluenesulphonate and nickel toluenesulphonate.

6. A process according to claim 1 wherein the complexing agent is selected from the group consisting of mono-, di- or poly-hydroxy carboxylic acids or alkali metal salts thereof.

7. A process according to claim 1 wherein the electroplating bath further comprises a grain refining agent comprising a bath soluble substituted phenolic compound of the formula:

where n is an integer from 1 to 100, m is 2 or 3 and R1 is either a phenolic group of the formula:

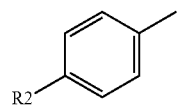

where R2 is a (C1-C14) alkyl group or, an alpha or beta naphthalene group of the formula:

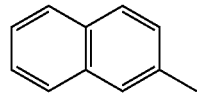

and,
R3 is H, CH$_2$CH$_2$OH, CH$_2$CH$_2$CH$_2$OH, CH$_2$CH(OH)CH$_2$SO$_3$H or CH$_2$CH$_2$CH$_2$SO$_3$H.

8. A process as claimed in claim 1 wherein the first time interval is from about 10 seconds to about 100 seconds and second time interval is from about 20 seconds to about 200 seconds.

9. A process as claimed in claim 1 wherein the pulsed current has a frequency of from about 10 Hz to about 500 Hz.

10. A process as claimed in claim 1 wherein said first current density is substantially the same as the current density in the first time interval.

11. A process as claimed in claim 10 wherein the duty cycle of the pulsed current is from about 20% to about 50%.

12. A process as claimed in claim 1 wherein the substrate is a bearing and the electroplated tin alloy coating constitutes a bearing overlay.

13. A process as claimed in claim 1, wherein the electroplating bath comprises an anionic wetting agent.

14. A process as claimed in claim 1, wherein the electroplating bath comprises a salt selected from the group consisting of sodium sulphate, ammonium chloride, and combinations of the foregoing.

* * * * *